(12) United States Patent
Takahashi et al.

(10) Patent No.: US 9,926,438 B2
(45) Date of Patent: *Mar. 27, 2018

(54) RUBBER COMPOSITION FOR HEAVY-LOAD TIRE, AND PNEUMATIC TIRE

(71) Applicant: THE YOKOHAMA RUBBER CO., LTD., Minato-ku, Tokyo (JP)

(72) Inventors: Ryota Takahashi, Hiratsuka (JP);
Manabu Kato, Hiratsuka (JP);
Takahiro Okamatsu, Hiratsuka (JP);
Yoshiaki Kirino, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/311,446

(22) PCT Filed: Dec. 19, 2014

(86) PCT No.: PCT/JP2014/083769
§ 371 (c)(1),
(2) Date: Nov. 15, 2016

(87) PCT Pub. No.: WO2015/173993
PCT Pub. Date: Nov. 19, 2015

(65) Prior Publication Data
US 2017/0218185 A1 Aug. 3, 2017

(30) Foreign Application Priority Data
May 16, 2014 (JP) .................... 2014-102232

(51) Int. Cl.
C08L 7/00 (2006.01)
B60C 1/00 (2006.01)
C08C 19/22 (2006.01)

(52) U.S. Cl.
CPC .............. *C08L 7/00* (2013.01); *B60C 1/0016* (2013.01); *C08C 19/22* (2013.01); *B60C 2200/06* (2013.01); *C08L 2205/03* (2013.01); *C08L 2205/035* (2013.01)

(58) Field of Classification Search
CPC ................ C08L 7/00; C08L 9/00; C08K 3/04
See application file for complete search history.

(56) References Cited

U.S. PATENT DOCUMENTS

| 3,792,031 A | 2/1974 | Udding |
| 9,493,599 B2* | 11/2016 | Takahashi ............... C08C 19/22 |
| 2006/0084730 A1 | 4/2006 | Fukushima et al. |
| 2017/0002101 A1* | 1/2017 | Takahashi ................. C08L 9/06 |
| 2017/0107363 A1* | 4/2017 | Sasakuma .............. B65G 15/32 |

FOREIGN PATENT DOCUMENTS

| JP | S47-25712 B1 | 7/1972 |
| JP | S48-016996 A | 3/1973 |
| JP | 2008-517071 A | 5/2008 |
| JP | 2008-208163 A | 9/2008 |
| JP | 2011-057967 A | 3/2011 |
| JP | 2013-032471 A | 2/2013 |

* cited by examiner

*Primary Examiner* — Rip A Lee
(74) *Attorney, Agent, or Firm* — Carrier Blackman & Associates, P.C.; Joseph P. Carrier; Anne G. Sabourin

(57) ABSTRACT

An object of the present invention is to provide a rubber composition for a heavy-load tire having excellent low heat build-up when formed into a tire and excellent flowability of the rubber during vulcanization, and a pneumatic tire produced using the rubber composition. The rubber composition for a heavy-load tire contains a diene rubber and a carbon black; the diene rubber containing: a natural rubber; and a modified polymer obtained by modifying a conjugated diene polymer with a nitrone compound; the content of the natural rubber in the diene rubber being not less than 60 mass %; and the content of the modified polymer in the diene rubber being not greater than 40 mass %; and the content of the carbon black being from 30 to 70 parts by mass per 100 parts by mass of the diene rubber.

20 Claims, 1 Drawing Sheet

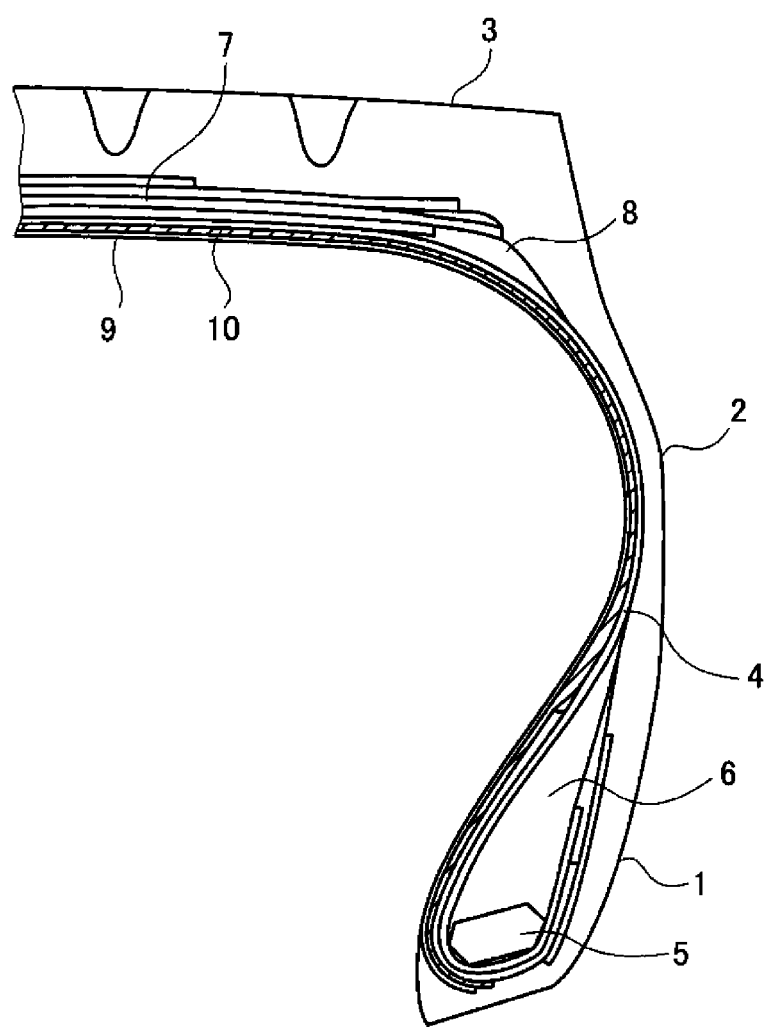

RUBBER COMPOSITION FOR HEAVY-LOAD TIRE, AND PNEUMATIC TIRE

TECHNICAL FIELD

The present invention relates to a rubber composition for a heavy-load tire and a pneumatic tire.

BACKGROUND ART

There is a demand for the tires of heavy-load vehicles (heavy-load tires) to have the properties of low heat build-up and wear resistance, in particular. Under such circumstances, rubber compositions containing a carbon black or a silica compounded with a rubber component containing a natural rubber as a main component are primarily used as rubber compositions for heavy-load tires.

For example, a rubber composition for a tire tread suitable for a heavy-load pneumatic tire containing a carbon black and a diene rubber containing not less than 50 mass % of a natural rubber is disclosed in Patent Document 1 (claims, paragraph [0031]).

CITATION LIST

Patent Literature

Patent Document 1: Japanese Unexamined Patent Application Publication No. 2011-57967A

SUMMARY OF INVENTION

Technical Problem

On the other hand, due to reasons such as enhanced fuel consumption of heavy-load vehicles, there has been a demand in recent years for further improvements in the low heat build-up of heavy-load tires.

Under such circumstances, when the present inventors investigated rubber compositions containing a carbon black and a diene rubber containing not less than 50 mass % of a natural rubber with reference to Patent Document 1, it became clear that further improvements in low heat build-up are necessary.

In addition, it became clear that a rubber composition containing a diene rubber having a natural rubber as a main component may have low flowability of the rubber during vulcanization, which may lead to block breakage or light breakdown (streaks may be formed in the tire surface or the tire surface may be damaged in a strip shape due to poor flowability of the rubber from the bead section to the side section during the vulcanization process).

Therefore, in the light of the above circumstances, an object of the present invention is to provide a rubber composition for a heavy-load tire having excellent low heat build-up when formed into a tire and excellent flowability during vulcanization, and a pneumatic tire produced using the rubber composition.

SUMMARY OF THE INVENTION

As a result of conducting dedicated research on the problems described above, the present inventors discovered that the problems can be solved by using a natural rubber and a modified polymer obtained by modifying a conjugated diene polymer with a nitrone compound in combination as a diene rubber and compounding the components at the prescribed ratio of each component, and the present inventors thereby completed the present invention.

Specifically, the inventors discovered that the object described above can be achieved by the following features.

(1) A rubber composition for a heavy-load tire containing a diene rubber and a carbon black;

the diene rubber comprising: a natural rubber; and a modified polymer obtained by modifying a conjugated diene polymer with a nitrone compound; the content of the natural rubber in the diene rubber being not less than 60 mass %; and the content of the modified polymer in the diene rubber being not more than 40 mass %; and the content of the carbon black being from 30 to 70 parts by mass per 100 parts by mass of the diene rubber.

(2) The rubber composition for a heavy-load tire according to (1) further containing a silica, wherein the content of the silica is from 5 to 20 parts by mass per 100 parts by mass of the diene rubber; and the total content of the carbon black and the silica is from 35 to 70 parts by mass per 100 parts by mass of the diene rubber.

(3) The rubber composition for a heavy-load tire according to (1) or (2), wherein a nitrogen adsorption specific surface area of the carbon black is from 60 to 150 [$\times 10^3$ m$^2$/kg].

(4) A rubber composition for a heavy-load tire according to any one of (1) to (3) further containing a thermoplastic resin, wherein the content of the thermoplastic resin is from 0.1 to 10 parts by mass per 100 parts by mass of the diene rubber.

(5) The rubber composition for a heavy-load tire according to any one of (1) to (4), wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

(6) The rubber composition for a heavy-load tire according to any one of (1) to (5), wherein a degree of modification the modified polymer is from 0.02 to 4.0 mol %; the degree of modification represents a proportion (mol %) of double bonds modified with the nitrone compound relative to all double bonds originating from conjugated diene of the conjugated diene polymer.

(7) The rubber composition for a heavy-load tire according to any one of (1) to (6) used in a tire tread.

(8) A pneumatic tire wherein the rubber composition for a heavy-load tire according to any one of (1) to (7) is used in the pneumatic tire.

Advantageous Effects of Invention

As described below, according to the present invention, a rubber composition for a heavy-load tire having excellent low heat build-up when formed into a tire and excellent flowability of the rubber during vulcanization, and a pneumatic tire produced using the rubber composition can be provided.

BRIEF DESCRIPTION OF DRAWING

FIG. 1 is a partial cross-sectional schematic view of a tire that represents one embodiment of a pneumatic tire of the present invention.

DESCRIPTION OF EMBODIMENT

Hereinafter, a rubber composition for a heavy-load tire of the present invention and a pneumatic tire produced using the rubber composition for a heavy-load tire of the present invention will be described.

In this specification, a numerical range represented using "(from) . . . to . . . " refers to a range including the numerical values stated before and after the " . . . to . . . " as a lower limit value and an upper limit value.

Rubber Composition for a Heavy-Load Tire

The rubber composition for a heavy-load tire of the present invention (also called the "composition of the present invention" hereafter) contains a diene rubber and a carbon black.

Here, the diene rubber contains: a natural rubber; and a modified polymer obtained by modifying a conjugated diene polymer with a nitrone compound; the content of the natural rubber in the diene rubber being not less than 60 mass %. In addition, the content of the modified polymer in the diene rubber is not more than 40 mass %; and the content of the carbon black is from 30 to 70 parts by mass per 100 parts by mass of the diene rubber.

The composition of the present invention is thought to have excellent low heat build-up when formed into a tire and excellent flowability of the rubber during vulcanization as a result of assuming such a configuration. Although the reason for this is unknown, the reason is presumed to be as follows.

As described above, the composition of the present invention contains a modified polymer obtained by modifying a conjugated diene polymer with a nitrone compound. Therefore, nitrone residues (nitrone groups after modification) in the modified polymer interact with the carbon black in the composition (when the composition contains a silica, the nitrone residues also interact with the silica in the composition) so as to increase the dispersibility of the carbon black (when the composition contains a silica, this interaction also increases the dispersibility of the silica in the composition). As a result, the Payne effect is reduced, which is thought to yield excellent low heat build-up when formed into a tire.

On the other hand, the interaction described above is a static electricity interaction and is a physical bond, so the bond is broken at the time of vulcanization (at around 150° C.), and the two components are dissociated. Therefore, the composition of the present invention is thought to have low viscosity during vulcanization and is thought to have excellent flowability of the rubber during vulcanization as a result.

Each component contained in the composition of the present invention will be described in detail hereinafter.

Diene Rubber

The diene rubber contained in the composition of the present invention contains: a natural rubber; and a modified polymer obtained by modifying a conjugated diene polymer with a nitrone compound. Here, the content of the natural rubber in the diene rubber is not less than 60 mass %, and the content of the modified polymer in the diene rubber is not more than 40 mass %.

Note that the natural rubber may contain rubber components other than the natural rubber and the modified polymer described above. The other rubber components are not particularly limited, but examples thereof include isoprene rubber (IR), butadiene rubber (BR), aromatic vinyl-conjugated diene copolymer rubber (for example, SBR), acrylonitrile-butadiene copolymer rubber (NBR), butyl rubber (IIR), halogenated butyl rubber (Br-IIR, Cl-IIR), and chloroprene rubber (CR). Of these, isoprene rubber (IR) and butadiene rubber (BR) are preferable.

Natural Rubber

As described above, the diene rubber contained in the composition of the present invention contains a natural rubber.

The content of the natural rubber in the diene rubber is not less than 60 mass %. Within this range, the content is preferably from 70 to 90 mass %.

If the content of the natural rubber in the diene rubber is less than 60 mass %, the wear resistance of the resulting tire is insufficient.

Modified Polymer

As described above, the diene rubber contained in the composition of the present invention contains a modified polymer obtained by reacting a conjugated diene polymer with a nitrone compound.

Conjugated Diene Polymer

The conjugated diene polymer used in the production of the modified polymer is not particularly limited, and examples thereof include natural rubber (NR), isoprene rubber (IR), butadiene rubber (BR), aromatic vinyl-conjugated diene copolymer rubber (for example, SBR), acrylonitrile-butadiene copolymer rubber (NBR), butyl rubber (IIR), halogenated butyl rubber (Br-IIR, Cl-IIR), and chloroprene rubber (CR). Of these, isoprene rubber (IR) and butadiene rubber (BR) are preferable. Of these, butadiene rubber (BR) is more preferable in that the low heat build-up of the resulting tire is superior, the flowability of the rubber during vulcanization is superior, and the wear resistance is excellent.

The weight average molecular weight (Mw) of the conjugated diene polymer is not particularly limited but is preferably from 100,000 to 2,000,000 from the perspective of handleability. Note that in this specification, the weight average molecular weight (Mw) is measured in terms of standard polystyrene by gel permeation chromatography (GPC) using tetrahydrofuran as a solvent.

Nitrone Compound

The nitrone compound used in the production of the modified polymer is not particularly limited as long as the nitrone compound is a compound having a nitrone group represented by Formula (1) below.

[Chemical Formula 1]

Formula (1)

In Formula (1), * indicates a bonding position.

The nitrone compound described above is preferably a compound represented by Formula (2) below.

[Chemical Formula 2]

Formula (2)

In Formula (2), X and Y each independently represent an aliphatic hydrocarbon group, an aromatic hydrocarbon group, or an aromatic heterocyclic group which may have substituents.

Examples of the aliphatic hydrocarbon group represented by X or Y include alkyl groups, cycloalkyl groups, and alkenyl groups. Examples of the alkyl groups include methyl groups, ethyl groups, n-propyl groups, isopropyl groups, n-butyl groups, isobutyl groups, sec-butyl groups, tert-butyl groups, n-pentyl groups, isopentyl groups, neopentyl groups, tert-pentyl groups, 1-methylbutyl groups, 2-methylbutyl groups, 1,2-dimethylpropyl groups, n-hexyl groups, n-heptyl groups, and n-octyl groups. Among these, alkyl groups having from 1 to 18 carbons are preferable, and alkyl groups having from 1 to 6 carbons are more preferable. Examples of the cycloalkyl groups include cyclopropyl groups, cyclobutyl groups, cyclopentyl groups, and cyclohexyl groups. Among these, cycloalkyl groups having from 3 to 10 carbons are preferable, and cycloalkyl groups having from 3 to 6 carbons are more preferable. Examples of the alkenyl groups include vinyl groups, 1-propenyl groups, allyl groups, isopropenyl groups, 1-butenyl groups, and 2-butenyl groups. Among these, alkenyl groups having from 2 to 18 carbons are preferable, and alkenyl groups having from 2 to 6 carbons are more preferable.

Examples of the aromatic hydrocarbon group represented by X or Y include aryl groups, and aralkyl groups.

Examples of the aryl groups include phenyl groups, naphthyl groups, anthryl groups, phenanthryl groups, and biphenyl groups. Among these, aryl groups having from 6 to 14 carbons are preferable, aryl groups having from 6 to 10 carbons are more preferable, and a phenyl group and a naphthyl group are even more preferable.

Examples of the aralkyl groups include benzyl groups, phenethyl groups, and phenylpropyl groups. Among these, aralkyl groups having from 7 to 13 carbons are preferable, aralkyl groups having from 7 to 11 carbons are more preferable, and a benzyl group is even more preferable.

Examples of the aromatic heterocyclic group represented by X or Y include pyrrolyl groups, furyl groups, thienyl groups, pyrazolyl groups, imadazolyl groups (imadazol groups), oxazolyl groups, isooxazolyl groups, thiazolyl groups, isothiazolyl groups, pyridyl groups (pyridine groups), furan groups, thiophene groups, pyridazinyl groups, pyrimidinyl groups, and pyradinyl groups. Among these, pyridyl groups are preferable.

The substituents of the group represented by X or Y are not particularly limited, and examples thereof include alkyl groups having from 1 to 4 carbons, hydroxy groups, amino groups, nitro groups, carboxy groups, sulfonyl groups, alkoxy groups, and halogen atoms. Among these, carboxy groups are preferable.

Note that examples of the aromatic hydrocarbon group having such a substituent include aryl groups having a substituent, such as a tolyl group and xylyl group; and aralkyl groups having a substituent, such as a methylbenzyl group, ethylbenzyl group, and methylphenethyl group.

The compound represented by Formula (2) above is preferably a compound represented by Formula (3) below.

[Chemical Formula 3]

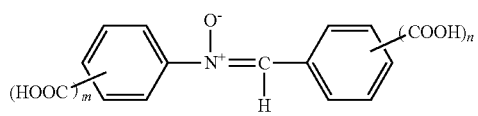

Formula (3)

In Formula (3), m and n each independently represent an integer from 0 to 5, and the sum of m and n is 1 or greater.

The integer represented by m is preferably an integer from 0 to 2, and more preferably an integer 0 or 1, because solubility to a solvent during nitrone compound synthesis is better and thus synthesis easier.

The integer represented by n is preferably an integer from 0 to 2, and more preferably an integer 0 or 1, because solubility to a solvent during nitrone compound synthesis is better and thus synthesis easier.

Furthermore, the sum of m and n (m+n) is preferably from 1 to 4, and more preferably 1 or 2.

The carboxynitrone represented by Formula (3) is not particularly limited but is preferably a compound selected from the group consisting of N-phenyl-α-(4-carboxyphenyl)nitrone represented by Formula (3-1) below, N-phenyl-α-(3-carboxyphenyl)nitrone represented by Formula (3-2) below, N-phenyl-α-(-2-carboxyphenyl)nitrone represented by Formula (3-3) below, N-(-4-carboxyphenyl)-α-phenylnitrone represented by Formula (3-4) below, N-(-3-carboxyphenyl)-α-phenylnitrone represented by Formula (3-5) below, and N-(2-carboxyphenyl)-α-phenylnitrone represented by Formula (3-6) below.

[Chemical Formula 4]

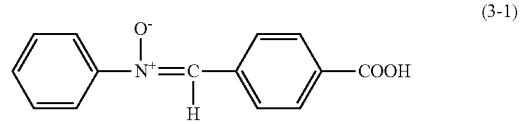

(3-1)

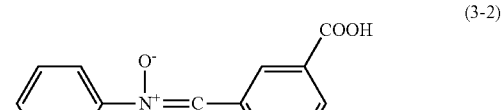

(3-2)

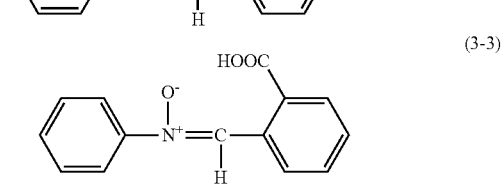

(3-3)

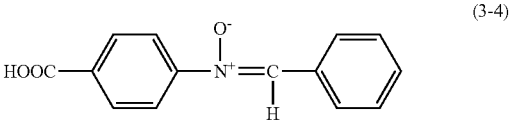

(3-4)

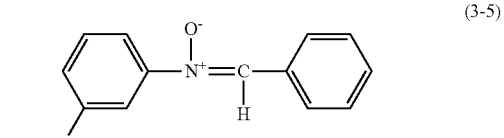

(3-5)

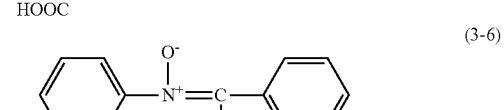

(3-6)

The method of synthesizing the nitrone compound is not particularly limited, and conventionally known methods can be used. For example, a nitrone compound having a nitrone group is obtained by stirring a compound having a hydroxyamino group (—NHOH) and a compound having an aldehyde group (—CHO) at a molar ratio of hydroxyamino group to aldehyde group (—NHOH/—CHO) of from 1.0 to 1.5 in the presence of an organic solvent (for example methanol, ethanol, tetrahydrofuran, and the like) at room temperature for 1 to 24 hours to allow the both groups to react, thereby yielding a nitrone compound having a nitrone group.

Method for Producing Modified Polymer

The method for modifying the conjugated diene polymer with a nitrone compound is not particularly limited, but an example is a method of mixing the conjugated diene polymer described above and the nitrone compound described above for 1 to 30 minutes at 100 to 200° C.

At this time, a cycloaddition reaction occurs between the double bonds originating from conjugated diene in the conjugated diene polymer and the nitrone groups of the nitrone compound, forming a five-membered ring as illustrated in Formula (4) or Formula (5) below. Note that Formula (4) below represents a reaction between a 1,4 bond and a nitrone compound, and Formula (5) below represents a reaction between a 1,2-vinyl bond and a nitrone compound. In addition, Formulas (4) and (5) represent reactions for cases in which the conjugated diene is butadiene (1,3-butadiene), but five-membered rings may also be formed by the same reactions when the conjugated diene is a compound other than butadiene.

[Chemical Formula 5]

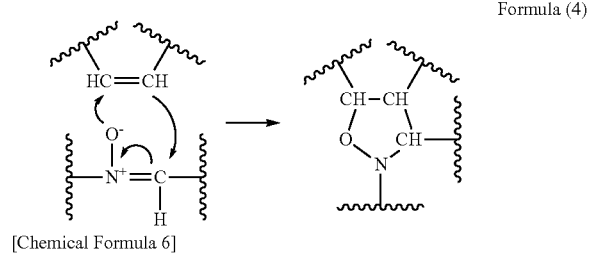

Formula (4)

[Chemical Formula 6]

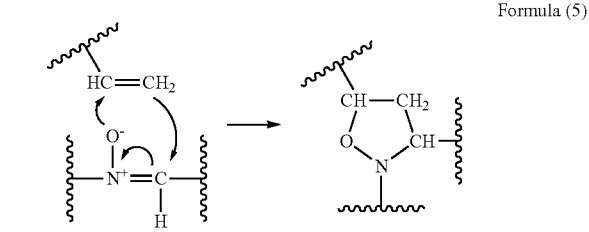

Formula (5)

The amount of the nitrone compound reacted with the conjugated diene polymer is not particularly limited but is preferably from 0.1 to 10 parts by mass and more preferably from 0.3 to 5 parts by mass per 100 parts by mass of the conjugated diene polymer. The amount of the nitrone compound reacted with the conjugated diene polymer is preferably more than 1 part by mass per 100 parts by mass of the conjugated diene polymer.

Degree of Modification

The degree of modification of the modified polymer is not particularly limited but is preferably from 0.02 to 4.0 mol % and more preferably from 0.1 to 2.0 mol %.

Here, the degree of modification represents the proportion (mol %) of double bonds modified with the nitrone compound relative to all double bonds originating from the conjugated diene (conjugated diene units) of the conjugated diene polymer. For example, when the conjugated diene is butadiene (1,3-butadiene), the degree of modification represents the proportion (mol %) in which the structure of Formula (4) or (5) above is formed via modification with the nitrone compound. The degree of modification, for example, can be determined by NMR measurement of the conjugated diene polymer and the modified polymer (that is, the polymers before and after modification).

Note that in this specification, a modified polymer having a degree of modification of 100 mol % falls under the category of a diene rubber.

As described above, the content of the modified polymer in the diene rubber is not more than 40 mass %. The lower limit of the content of the modified polymer in the diene rubber is not particularly limited but is preferably not less than 5 mass %.

The content of the modified polymer in the diene rubber is preferably not less than 12 mass % and more preferably not less than 17 mass %.

Carbon Black

The carbon black contained in the composition of the present invention is not particularly limited, but examples that can be used include compositions of various grades such as SAF-HS, SAF, ISAF-HS, ISAF, ISAF-LS, IISAF-HS, HAF-HS, HAF, HAF-LS, FEF, GPF, and SRF. Of these, SAF-HS, SAF, ISAF-HS, ISAF, ISAF-LS, IISAF-HS, HAF-HS, HAF, and HAF-LS are preferred.

The nitrogen adsorption specific surface area ($N_2SA$) of the carbon black is not particularly limited but is preferably from 60 to 150 [$\times 10^3$ m$^2$/kg]. Within this range, the nitrogen adsorption specific surface area is more preferably from 60 to 120 [$\times 10^3$ m$^2$/kg].

Note that the nitrogen adsorption specific surface area ($N_2SA$) is a value of the amount of nitrogen adsorbed to a surface of carbon black, measured in accordance with JIS K6217-2:2001 (Part 2: Determination of specific surface area—Nitrogen adsorption methods—Single-point procedures).

The content of the carbon black in the composition of the present invention is preferably from 30 to 70 parts by mass per 100 parts by mass of the diene rubber. Within this range, the content is preferably from 35 to 60 parts by mass.

When the content of the carbon black is less than 30 parts by mass per 100 parts by mass of the diene rubber, the wear resistance of the resulting tire is insufficient.

When the content of the carbon black exceeds 70 parts by mass per 100 parts by mass of the diene rubber, the low heat build-up of the resulting tire is insufficient.

Optional Components

The composition of the present invention may further contain additives as necessary within a scope that does not inhibit the effect or purpose thereof.

Examples of the additives include various additives typically used in rubber compositions, such as fillers other than carbon black (for example, silica), silane coupling agents, zinc oxide (zinc white), stearic acid, thermoplastic resins, resins for bonding, peptizing agents, anti-aging agents, waxes, processing aids, aroma oils, liquid polymers, terpene-based resins, thermosetting resins, vulcanizing agents (for example, sulfur), and vulcanizing accelerators.

Silica

The composition of the present invention preferably contains a silica.

The silica is not particularly limited, and any conventionally known silica that is compounded into a rubber composition in applications such as tires can be used.

Specific examples of the silicas include wet silica, dry silica, fumed silica, and diatomaceous earth. One type of silica may be used alone, or two or more types of silicas may be used in combination.

The content of the silica in the composition of the present invention is not particularly limited but is preferably from 5 to 20 parts by mass per 100 parts by mass of the diene rubber.

The total content of the carbon black and the silica in the composition of the present invention is not particularly limited but is preferably from 35 to 70 parts by mass per 100 parts by mass of the diene rubber.

Thermoplastic Resin

The composition of the present invention preferably contains a thermoplastic resin.

The thermoplastic resin is not particularly limited, but a rosin resin or a petroleum resin may be used. Examples of the rosin resins include gum rosins, wood rosins, and tall oil rosins containing resin acids such as abietic acid, palustric acid, pimaric acid, isopimaric acid, and dehydroabietic acid as main components. In addition, disproportionated rosins obtained by disproportionating these rosins, polymerized rosins obtained by dimerization or higher polymerization, and hydrogenated rosins obtained by hydrogenation may also be used. Moreover, in the present invention, modified rosins that are modified by partially maleating and/or fumarating rosins may also be used. Furthermore, petroleum resin-modified rosins which are modified with petroleum resins may also be used. Examples of the petroleum resins include C9 petroleum resins obtained by cationic polymerization of a C9 fraction obtained by petroleum refining such as naphtha cracking, C5 petroleum resins obtained by thermal polymerization of a C5 fraction such as cyclopentadiene or dicyclopentadiene, and C5 to C9 petroleum resins obtained by polymerizing C5 to C9 fractions. In addition, examples of the derivatives of petroleum resins include alicyclic hydrogenated petroleum resins obtained by completely or partially hydrogenating the various petroleum resins described above, and mixtures of these petroleum resins and petroleum resin derivatives.

The content of the thermoplastic resin in the composition of the present invention is not particularly limited but is preferably from 0.1 to 10 parts by mass per 100 parts by mass of the diene rubber in that the low heat build-up of the resulting tire is superior.

Production Method for Rubber Composition for a Heavy-Load Tire

The method for producing the composition of the present invention is not particularly limited, and specific examples thereof include a method whereby each of the above-mentioned components is kneaded using a publicly known method and device (e.g. Banbury mixer, kneader, roll, and the like). When the composition of the present invention contains sulfur or a vulcanization accelerator, the components other than the sulfur and the vulcanization accelerator are preferably blended first at a high temperature (preferably from 60 to 120° C.) and then cooled before the sulfur or the vulcanization accelerator is blended.

In addition, the composition of the present invention can be vulcanized or crosslinked under conventional, publicly known vulcanizing or crosslinking conditions.

Application

The composition of the present invention is used for production of heavy-load tires. In particular, the composition is suitably used in a tire tread of a heavy-load tire.

Pneumatic Tire

The pneumatic tire of the present invention is a pneumatic tire produced using the composition of the present invention described above. In particular, the tire is preferably a pneumatic tire produced using the composition of the present invention described above in a tire tread.

FIG. 1 is a partial cross-sectional schematic view of a tire that represents one embodiment of the pneumatic tire of the present invention, but the pneumatic tire of the present invention is not limited to the embodiment illustrated in FIG. 1.

In FIG. 1, the pneumatic tire comprises a left-right pair of bead portions 1, sidewall portions 2, and a tire tread portion 3 extending from both sidewall portions 2. A carcass layer 4 in which steel cords are embedded is mounted between the left-right pair of bead portions 1, and the ends of the carcass layer 4 are turned up and wrapped around bead cores 5 and bead fillers 6 from an inner side to an outer side of the tire. In the tire tread portion 3, a belt layer 7 is provided along the entire circumference of the tire 1 on the outer side of the carcass layer 4. Belt cushions 8 are provided on both ends of the belt layer 7. An innerliner 9 is provided on the inside surface of the pneumatic tire in order to prevent the air filling the inside of the tire from leaking to the outside of the tire, and a tie rubber 10 for adhering the innerliner 9 is laminated between the carcass layer 4 and the innerliner 9.

The pneumatic tire of the present invention can be produced, for example, in accordance with a conventionally known method. In addition to ordinary air or air with an adjusted oxygen partial pressure, inert gases such as nitrogen, argon, and helium can be used as the gas with which the tire is filled.

Examples

Hereinafter, the present invention will be further described in detail with reference to examples; however, the present invention is not limited thereto.

Synthesis of Nitrone Compound

In a 2 L eggplant-shaped flask, methanol heated to 40° C. (900 mL) was placed, and then terephthalaldehydic acid represented by Formula (b-1) below (30.0 g) was added and dissolved. In this solution, a solution in which phenylhydroxylamine represented by Formula (a-1) below (21.8 g) was dissolved in methanol (100 mL) was added and stirred at room temperature for 19 hours. After the completion of stirring, a nitrone compound (carboxynitrone) represented by formula (c-1) below was obtained by recrystallization from methanol (41.7 g). The yield was 86%.

[Chemical Formula 7]

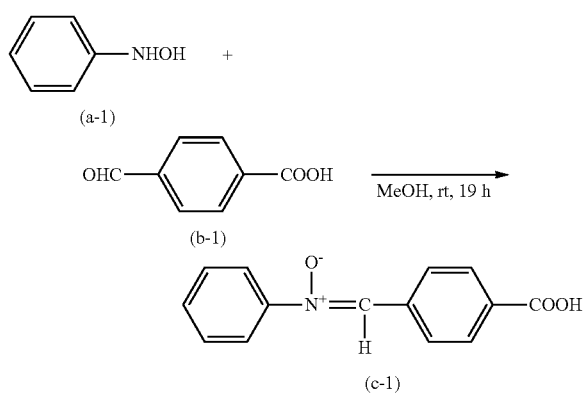

Synthesis of Modified Polymer (Modified Polymer 1)

A butadiene rubber (Nipol BR1220 manufactured by the Zeon Corporation) was loaded into a 120° C. Banbury mixer and kneaded for 2 minutes. Next, 3 parts by mass of a nitrone compound synthesized as described above was added per 100 parts by mass of the butadiene rubber and mixed for 2.5 minutes at 170° C. so as to modify the butadiene rubber with the nitrone compound. The resulting modified polymer was used as the modified polymer 1.

When the degree of modification of the resulting modified polymer 1 was determined by NMR measurement, the degree of modification of modified polymer 1 was 0.65 mol %. Specifically, the degree of modification was determined as described below. Specifically, the polymers before and after modification were measured for the peak area (derived from two protons adjacent to the carboxy group) at around 8.08 ppm via $^1$H-NMR (CDCl$_3$, 400 MHz, TMS) using CDCl$_3$ as a solvent to find the degree of modification. Note that the samples used in the $^1$H-NMR measurement of the modified polymer were dissolved in toluene, purified by methanol precipitation two times, and then dried under reduced pressure.

Synthesis of Modified Polymer (Modified Polymer 2)

An isoprene rubber was modified with a nitrone compound in accordance with the same procedure as that of the modified polymer 1 with the exception that an isoprene rubber (Nipol IR2200, manufactured by the Zeon Corporation) was used instead of a butadiene rubber (Nipol BR1220, manufactured by the Zeon Corporation). The resulting modified polymer was used as the modified polymer 2.

When the degree of modification of the resulting modified polymer 2 was determined by NMR measurement, the degree of modification of modified polymer 2 was 0.21 mol %. The manner of determining the degree of modification was as described above.

Preparation of Rubber Composition for Heavy-Load Tire

The components shown in Table 1 below were compounded in the proportions (parts by mass) shown in Table 1.

Specifically, the components shown in Table 1 below, excluding sulfur and a vulcanization accelerator, were first mixed in a Banbury mixer with a temperature of 80° C. for 4 minutes. Next, sulfur and a vulcanization accelerator were mixed using a roll so as to obtain each rubber composition for a heavy-load tire (a "rubber composition for a heavy-load tire" is also simply called a "rubber composition" hereafter).

Evaluation of Heat Build-Up

A vulcanized rubber sheet was prepared by press-vulcanizing each of the obtained (unvulcanized) rubber compositions for 30 minutes at 148° C. in a mold (15 cm×15 cm×0.2 cm).

The loss tangent (tan δ (60° C.)) was measured for each obtained vulcanized rubber sheet using a viscoelastic spectrometer (manufactured by Toyo Seiki Seisaku-sho, Ltd.) under the following conditions: 10% initial distortion, ±2% amplitude, 20 Hz frequency, and temperature of 60° C. The results are shown in Table 1 (heat build-up). The results of Working Examples 1 to 3 are shown percentages using the loss tangent of Comparative Example 1 as 100% and the results of Working Examples 4 to 6 are shown as percentages using the loss tangent of Comparative Example 2 as 100%. Smaller values indicate superior low heat build-up when formed into a tire.

Evaluation of Rubber Flowability

The minimum viscosity of each obtained rubber composition (unvulcanized) at 148° C. was measured with a rheometer. The results are shown in Table 1 (rubber flowability). The results of Working Examples 1 to 3 are shown as a percentage using the minimum viscosity of Comparative Example 1 as 100% and the results of Working Examples 4 to 6 are shown as a percentage using the minimum viscosity of Comparative Example 2 as 100%. Smaller values indicate superior flowability of the rubber during vulcanization.

In Table 1, the CPN compounded amount refers to the parts by mass of the nitrone compound used in the synthesis of the modified polymer with respect to 100 parts by mass of the diene rubber.

In addition, in Table 1, the degree of modification indicates the degree of modification of the modified polymer described above.

TABLE 1

|  | Comparative Example 1 | Working Example 1 | Working Example 2 | Working Example 3 |
|---|---|---|---|---|
| Natural rubber | 85.00 | 85.00 | 85.00 | 85.00 |
| Isoprene rubber |  |  |  |  |
| Butadiene rubber | 15.00 | 5.00 |  |  |
| Modified polymer 1 |  | 10.30 | 15.45 | 15.45 |
| Modified polymer 2 |  |  |  |  |
| Carbon black 1 |  |  |  |  |
| Carbon black 2 | 49.00 | 49.00 | 49.00 | 40.00 |
| Silica |  |  |  | 9.00 |
| Zinc oxide | 3.50 | 3.50 | 3.50 | 3.50 |
| Stearic acid | 1.50 | 1.32 | 1.23 | 1.23 |
| Thermoplastic resin |  |  |  |  |
| Peptizing agent | 0.04 | 0.04 | 0.04 | 0.04 |
| Anti-aging agent 1 | 1.50 | 1.50 | 1.50 | 1.50 |
| Anti-aging agent 2 | 0.40 | 0.40 | 0.40 | 0.40 |
| Wax | 1.00 | 1.00 | 1.00 | 1.00 |
| Silane coupling agent |  |  |  | 0.72 |
| Sulfur | 1.40 | 1.40 | 1.40 | 1.40 |
| Vulcanization accelerator | 1.20 | 1.20 | 1.20 | 1.20 |
| CPN compounded amount [part by mass] |  | 0.3 | 0.45 | 0.45 |
| Degree of modification (mol %) |  | 0.65 | 0.65 | 0.65 |
| Heat build-up | 100% | 91% | 91% | 89% |
| Rubber flowability | 100% | 96% | 93% | 91% |

|  | Comparative Example 2 | Working Example 4 | Working Example 5 | Working Example 6 |
|---|---|---|---|---|
| Natural rubber | 76.92 | 76.92 | 76.92 | 76.92 |
| Isoprene rubber | 23.08 | 13.08 | 8.08 | 3.08 |
| Butadiene rubber |  |  |  |  |
| Modified polymer 1 |  |  |  |  |
| Modified polymer 2 |  | 10.30 | 15.45 | 20.60 |
| Carbon black 1 | 40.00 | 40.00 | 40.00 | 40.00 |
| Carbon black 2 |  |  |  |  |
| Silica | 10.00 | 10.00 | 10.00 | 10.00 |
| Zinc oxide | 3.00 | 3.00 | 3.00 | 3.00 |
| Stearic acid | 2.00 | 1.82 | 1.73 | 1.64 |
| Thermoplastic resin | 1.98 | 1.98 | 1.98 | 1.98 |
| Peptizing agent | 0.09 | 0.09 | 0.09 | 0.09 |
| Anti-aging agent 1 | 2.00 | 2.00 | 2.00 | 2.00 |
| Anti-aging agent 2 | 1.00 | 1.00 | 1.00 | 1.00 |

TABLE 1-continued

| | | | | |
|---|---|---|---|---|
| Wax | 1.00 | 1.00 | 1.00 | 1.00 |
| Silane coupling agent | 0.80 | 0.80 | 0.80 | 0.80 |
| Sulfur | 1.25 | 1.25 | 1.25 | 1.25 |
| Vulcanization accelerator | 1.20 | 1.20 | 1.20 | 1.20 |
| CPN compounded amount [part by mass] | | 0.3 | 0.45 | 0.6 |
| Degree of modification (mol %) | | 0.21 | 0.21 | 0.21 |
| Heat build-up | 100% | 90% | 91% | 93% |
| Rubber flowability | 100% | 89% | 84% | 82% |

The details of each component shown in Table 1 above are as follows.

Natural rubber: TSR20

Isoprene rubber: Nipol IR2200 (manufactured by Zeon Corporation)

Butadiene rubber: Nipol BR 1220 (manufactured by Zeon Corporation)

Modified polymer 1: modified polymer 1 synthesized as described above

Modified polymer 2: modified polymer 2 synthesized as described above

Carbon black 1: Show Black S118 (nitrogen adsorption specific surface area: 140 [×10$^3$ m$^2$/kg], manufactured by Cabot Japan K.K.)

Carbon black 2: Show Black N234 (nitrogen adsorption specific surface area: 123 [×10$^3$ m$^2$/kg], manufactured by Cabot Japan K.K.)

Silica: ULTRASIL VN3GR (manufactured by EVONIK UNITED SILICA INDUSTRIAL LTD.)

Zinc white: Zinc Oxide III (manufactured by Seido Chemical Industry Co., Ltd.)

Stearic acid: Stearic acid YR (manufactured by NOF Corporation)

Thermoplastic resin: petroleum resin-modified rosin (Hitanol 1502Z, manufactured by Hitachi Chemical Co., Ltd.)

Peptizing agent: Noctizer SD (manufactured by Ouchi Shinko Chemical Industrial Co., Ltd.)

Anti-aging agent 1: SANTOFLEX 6PPD (manufactured by Soltia Europe)

Anti-aging agent 2: Nocrac 224 (manufactured by Ouchi Shinko Chemical Industrial Co., Ltd.)

Wax: SANNOC (manufactured by Ouchi Shinko Chemical Industrial Co., Ltd.)

Silane coupling agent: Si69 (manufactured by EVONIK DEGUSSA GMBH)

Sulfur: Golden Flower Sulfur Powder, 150 mesh (manufactured by Tsurumi Chemical Industry Co., Ltd.)

Vulcanization accelerator: Nocceler NS-P (manufactured by Ouchi Shinko Chemical Industrial Co., Ltd.)

As can be seen from Table 1, in comparison to Comparative Example 1 or 2 which does not contain a modified polymer, the working examples of the present invention which contain modified polymers all exhibited excellent low heat build-up when formed into a tire and excellent rubber flowability during vulcanization.

From a comparison of Working Examples 1 to 3, Working Examples 2 and 3 in which the content of the modified polymer in the diene rubber was not less than 12 mass % exhibited superior rubber flowability during vulcanization.

In a comparison of Working Examples 4 to 6, Working Example 5 and 6 in which the content of the modified polymer in the diene rubber was not less than 12 mass % exhibited superior rubber flowability during vulcanization. In particular, Working Example 6 in which the content of the modified polymer in the diene rubber was not less than 17 mass % exhibited even better rubber flowability during vulcanization.

From a comparison of Working Examples 2 and 3, Working Example 3 which further contains a silica exhibited superior low heat build-up and superior rubber flowability during vulcanization.

REFERENCE SIGNS LIST

1 Bead portion
2 Sidewall portion
3 Tire tread portion
4 Carcass layer
5 Bead core
6 Bead filler
7 Belt layer
8 Belt cushion
9 Innerliner
10 Tie rubber

The invention claimed is:

1. A rubber composition for a heavy-load tire comprising a diene rubber and a carbon black;
   the diene rubber comprising: a natural rubber; and a modified polymer obtained by modifying a conjugated diene polymer with a nitrone compound having a carboxy group; a content of the natural rubber in the diene rubber being not less than 60 mass %; and a content of the modified polymer in the diene rubber being not greater than 40 mass %; and a content of the carbon black being from 30 to 70 parts by mass per 100 parts by mass of the diene rubber.

2. The rubber composition for a heavy-load tire according to claim 1, further comprising a silica;
   wherein a content of the silica is from 5 to 20 parts by mass per 100 parts by mass of the diene rubber; and a total content of the carbon black and the silica is from 35 to 70 parts by mass per 100 parts by mass of the diene rubber.

3. The rubber composition for a heavy-load tire according to claim 1, wherein a nitrogen adsorption specific surface area of the carbon black is from 60 to 150 [×10$^3$ m$^2$/kg].

4. A rubber composition for a heavy-load tire according to claim 1, further comprising a thermoplastic resin, a content of the thermoplastic resin being from 0.1 to 10 parts by mass per 100 parts by mass of the diene rubber.

5. The rubber composition for a heavy-load tire according to claim 1, wherein
   the nitrone compound having a carboxy group is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

6. The rubber composition for a heavy-load tire according to claim 1, wherein a degree of modification of the modified polymer is from 0.02 to 4.0 mol %, wherein the degree of modification represents a proportion (mol %) of double bonds modified with the nitrone compound relative to all double bonds originating from conjugated diene of the conjugated diene polymer.

7. A tire tread comprising the rubber composition for a heavy-load tire according to claim 1.

8. A pneumatic tire comprising the rubber composition for a heavy-load tire described in claim 1.

9. The rubber composition for a heavy-load tire according to claim 2, wherein a nitrogen adsorption specific surface area of the carbon black is from 60 to 150 [×10³ m²/kg].

10. A rubber composition for a heavy-load tire according to claim 2, further comprising a thermoplastic resin, a content of the thermoplastic resin being from 0.1 to 10 parts by mass per 100 parts by mass of the diene rubber.

11. A rubber composition for a heavy-load tire according to claim 3, further comprising a thermoplastic resin, a content of the thermoplastic resin being from 0.1 to 10 parts by mass per 100 parts by mass of the diene rubber.

12. A rubber composition for a heavy-load tire according to claim 9, further comprising a thermoplastic resin, a content of the thermoplastic resin being from 0.1 to 10 parts by mass per 100 parts by mass of the diene rubber.

13. The rubber composition for a heavy-load tire according to claim 2, wherein
the nitrone compound having a carboxy group is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

14. The rubber composition for a heavy-load tire according to claim 3, wherein
the nitrone compound having a carboxy group is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

15. The rubber composition for a heavy-load tire according to claim 4, wherein
the nitrone compound having a carboxy group is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

16. The rubber composition for a heavy-load tire according to claim 9, wherein
the nitrone compound having a carboxy group is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

17. The rubber composition for a heavy-load tire according to claim 10, wherein
the nitrone compound having a carboxy group is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

18. The rubber composition for a heavy-load tire according to claim 11, wherein
the nitrone compound having a carboxy group is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

19. The rubber composition for a heavy-load tire according to claim 12, wherein
the nitrone compound having a carboxy group is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

20. The rubber composition for a heavy-load tire according to claim 2, wherein a degree of modification of the modified polymer is from 0.02 to 4.0 mol %, wherein the degree of modification represents a proportion (mol %) of double bonds modified with the nitrone compound relative to all double bonds originating from conjugated diene of the conjugated diene polymer.

\* \* \* \* \*